Jan. 22, 1957 R. A. JUMISCO 2,778,119
INVOLUTE CURVE CHECKING DEVICE
Filed April 20, 1954 4 Sheets-Sheet 1

Inventor
Roy A. Jumisco
L. D. Buch
Attorney

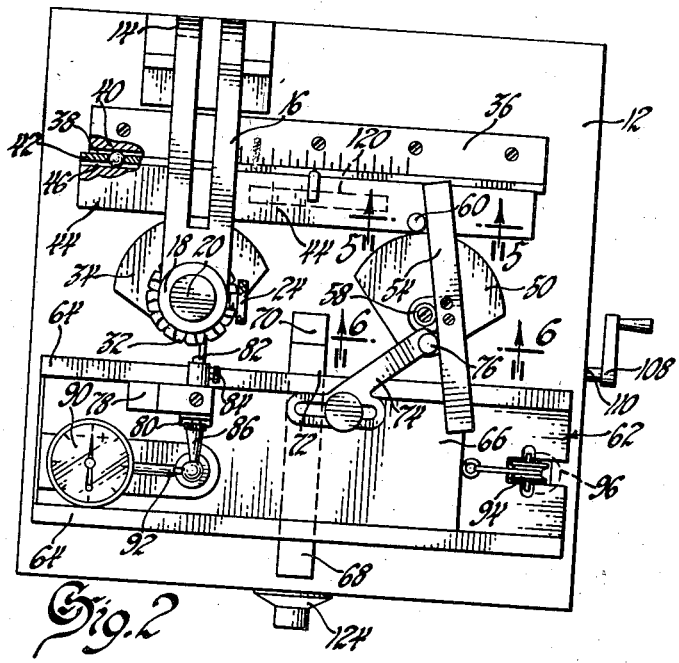

Jan. 22, 1957

R. A. JUMISCO 2,778,119

INVOLUTE CURVE CHECKING DEVICE

Filed April 20, 1954

Inventor
Roy A. Jumisco
L. D. Burch
Attorney

By

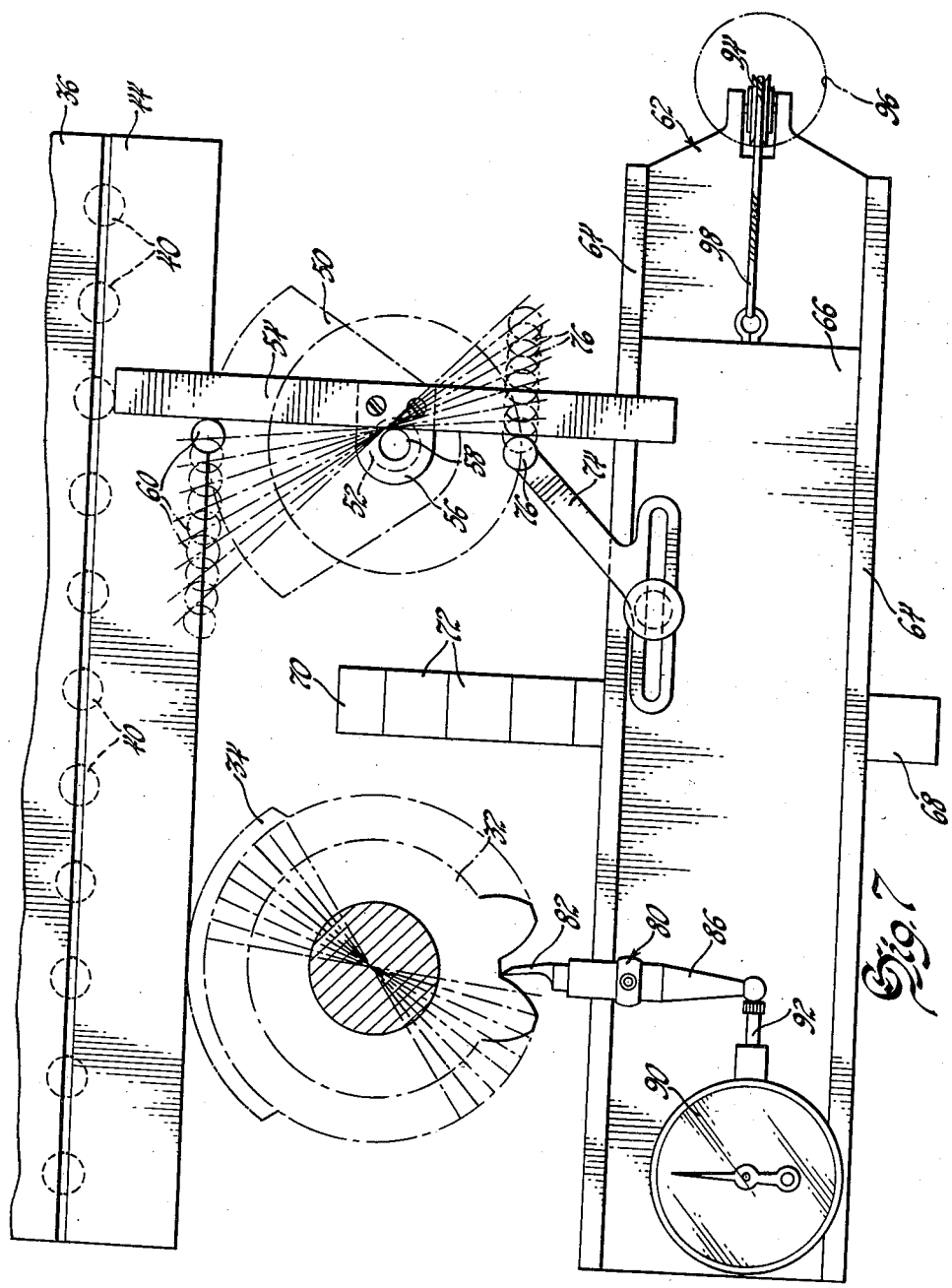

United States Patent Office 2,778,119
Patented Jan. 22, 1957

2,778,119

INVOLUTE CURVE CHECKING DEVICE

Roy A. Jumisco, Detroit, Mich., assignor to General Motors Corporation, Detroit, Mich., a corporation of Delaware Application April 20, 1954, Serial No. 424,304

1 Claim. (Cl. 33—179.5)

This invention relates to a device for checking the involute curvature of surfaces such as those of gear teeth and particularly to a device for checking the accuracy of the machined involute curvature of a gear tooth by comparison with a simultaneously evolved theoretical involute curve.

The teeth of spur gears, helical gears and herringbone gears have an involute curvature which is required to be accurate within prescribed tolerances to assure the proper mating engagement of such teeth with similar gear teeth. The involute curvature of an involute gear tooth being dependent upon the base circle of the gear, those devices which have been used to check the involute curvature of a gear tooth in the past have generally required the use of a base circle identical to that of the gear being checked. Other devices have made use of a master involute cam adapted to describe an involute of desired proportion. Still other devices have attempted to employ reproductive means with respect to an involute derived from a standardized base circle but the means employed by such devices have themselves embodied the errors sought and therefore have been incapable of satisfactorily evaluating the accuracy of the gear tooth under test.

Geometrically all involutes are similar in that an involute curve is dependent upon the size of the base circle from which it is derived. Since the involute curves of different base circles are proportionate to the diameters of their base circles an involute of a given base circle may be transposed by pantographic reduction or enlargement into an involute of a different base circle.

It is now proposed to provide a device for checking the involute curvature of a gear tooth by simultaneously evolving an involute curve and by superimposing such evolved curve by transposition upon the machined face of such gear tooth. It is proposed to provide a feeler or pointer which will transcribe the evolved involute curve along the face of the machined gear tooth and which is adapted to indicate variations between the actual and theoretical involute curves. It is further proposed to make use of a single base circle within the proposed device which need not be changed with the testing of involutes derived from different base circles. The standardized base circle is to be utilized to arrive at any given involute curvature through panographic reproductive means. It is still further proposed to transcribe the basic involute curve which is later reproduced in enlarged or reduced form by the expedient of a sliding beam in rolling contact with the base circle. Inasmuch as an involute curve is defined as that curve generated by the end of a taut string unwound from a base circle the involute curve evolved by the means proposed will be of truly accurate involute curvature.

In the drawings:

Figure 2 is a top plane view of the gear checking device.

Figure 3 is an end view of the gear checking device.

Figure 1:
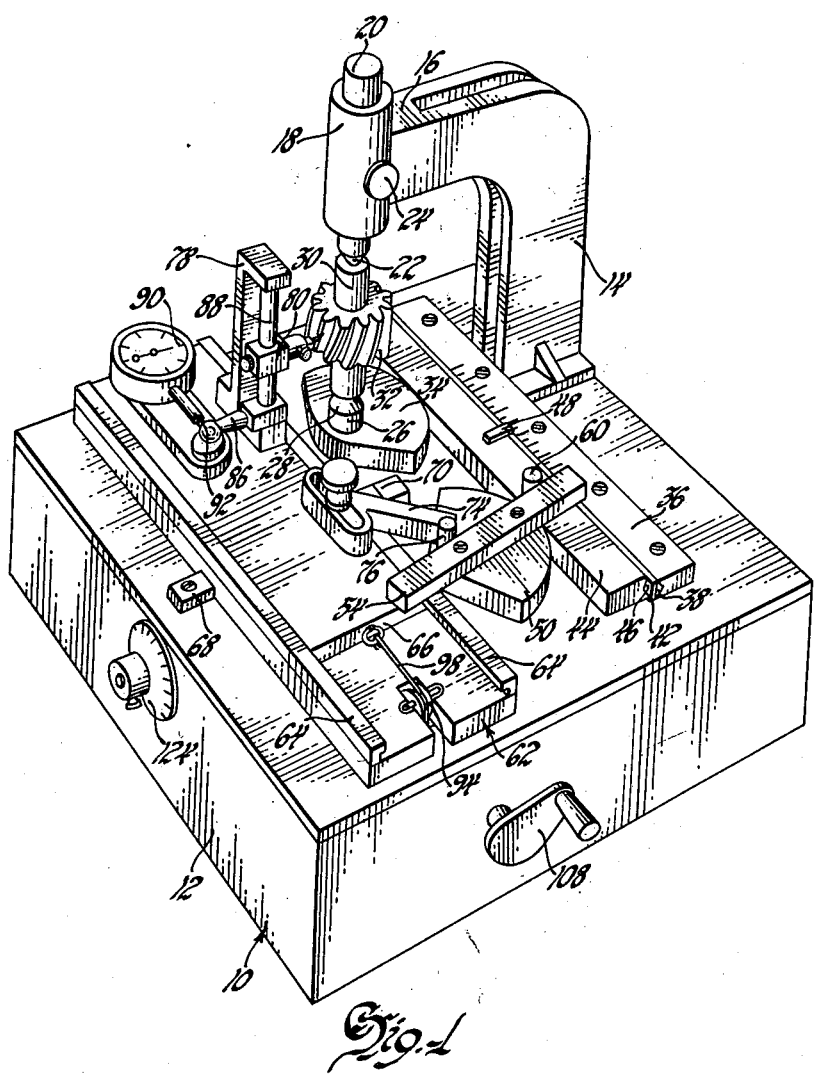
Figure 1 is an isometric view of the gear checking device.
Figure 4:
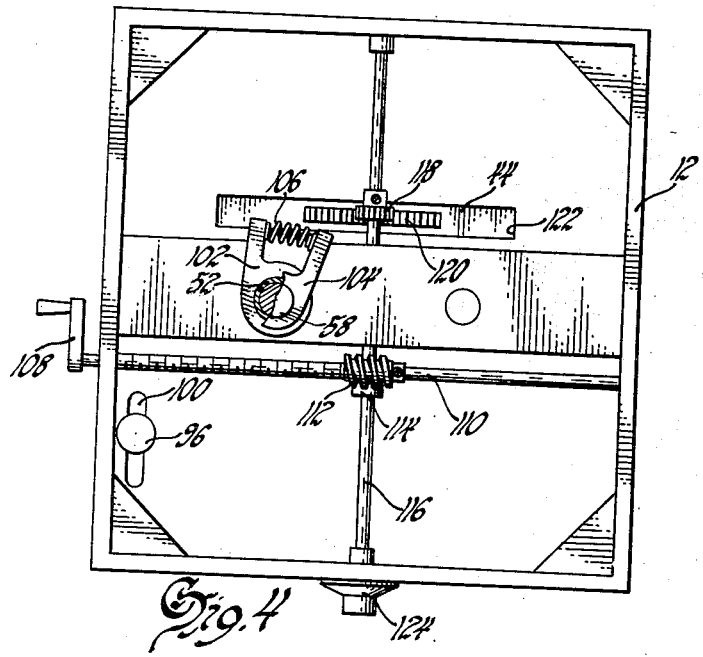
Figure 4 is a bottom view of the gear checking device.
Figure 5:
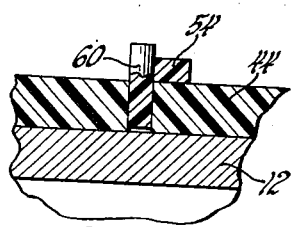
Figure 6:
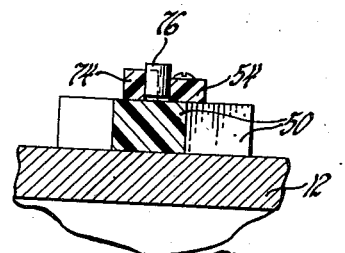

Figures 5 and 6 are cross sectional views taken in the plane of lines 5—5 and 6—6 respectively of Figure 2 and viewed in the direction of the arrows thereon.

Figure 7 is a diagrammatic illustration of the operation of the proposed gear checking device.

The gear checking device 10 shown in the drawings includes a housing or base member 12 having an upright support 14 secured thereto which includes an overhanging portion 16 having a vertically disposed tubular guide 18 fixed to its outer end. Within the tubular guide 18 is disposed a work centering spindle 20 having a tapered end 22. A set screw 24 is extended through the tubular guide 18 to engage the work centering spindle 20 and lock the spindle in any desired vertical position. Disposed axially beneath the work centering spindle 18 is a work support spindle 26 journalled for rotation within the base member 12 and disposed in upstanding position. The end 28 of the work support spindle 26 is tapered and is adapted to receive for rotation therewith one end of a gear support member 30 which is adapted to be disposed between the two spindles 20 and 26. A spur, helical or other gear 32 having gear teeth of involute curvature is adapted to be received upon the gear support member 30. A circular segment 34 hereafter referred to as the driven member or base cylinder is secured to the work support spindle 26.

Secured to the base member 12 tangentially of the base cylinder 34 and spaced apart therefrom is a guide member 36 marked with indicia of longitudinal movement. The forward edge of the guide member is undercut as at 38 to receive a plurality of ball bearings 40 retained within a ball bearing retainer member 42. A drive member 44 hereafter referred to as a rolling beam is disposed between the base cylinder 34 and the guide member 36 and has an undercut leading edge 46 in engagement with the ball bearings 40 thereby enabling the latter to move frictionlessly along the guide member. A marker or pointer 48 is secured to the rolling beam opposite the indicia marked on the guide member 36.

Disposed apart from the base cylinder 34 upon the base member 12 is a second circular segment 50, hereafter referred to as the idler disk, which is of the same diametric dimension as the base cylinder. The idler disk 50 is mounted upon a sleeve 52 journalled within the base member 12 and its prime function is to insure proper engagement of the rolling beam 44 with the guide member 36. A transfer bar 54 is secured to a bracket 56 which includes a shaft 58 journalled within the idler disk sleeve 52. One end of the transfer bar 54 engages a pin 60 secured to the rolling beam 44.

Mounted on the base member 12, on the other side of the base cylinder 34 and idler disk 50 from the guide member 36 and rolling beam 44, is a slide block carrier 62 having guide rails 64 within which a slide block or bar 66 is disposed. The slide block carrier 62 is movable transversely with respect to the guide member 36 and rolling beam 44 upon a guide 68 secured to the base member. The inner end of the guide 68 is formed to provide a stop 70. Individual gauge blocks 72 may be disposed upon the guide 68 between the slide block carrier 62 and the stop 70 to position the carrier transversely with respect to the rolling beam 44.

The slide block 66 includes an adjustable arm 74 having a pin 76 secured at one end and adapted to engage the transfer bar 54. An upstanding bracket 78 is also secured to the slide block 66 and is adapted to vertically support a feeler gauge 80 for freedom of pivotal movement in the horizontal plane. The feeler gauge 80 includes a pointer 82 adapted to make point contact engagement with the surface of the face of a tooth of the gear 32. The pointer 82 is axially extendable and is secured in position by set screw 84. A reactor arm 86 is secured to the shaft 88 supporting the feeler gauge 80 and is adapted to be horizontally displaced in conformance with any displacement of the pointer 82. A conventional tolerance gauge 90 is secured to the slide block 66 with the control plunger 92 thereof in engagement with the reactor arm 86.

In order to assure contact of the pin 76 of the arm 74 secured to the slide block 66 with the transfer bar 54 a pulley 94 is mounted in the slide block carrier 62 to accommodate a weight 96 tied on a line 98 secured to the slide block. The weight 96 is disposed within the base member 12 and the line 98 is passed through a slot 100 formed therein. The slot 100 is elongated to accommodate the line 98 in the various transverse positions of the carrier 62 as varied by the use of different gauge blocks.

To similarly assure contact of the transfer bar 54 with the pin 60 secured to the rolling beam 44 two lever arms 102 and 104 are secured one to the idler disk sleeve 52 and the other the transfer bar shaft 58 respectively with a compression spring 106 disposed between the two lever arms. The lever arms 102 and 104 need not move at the same rate since the spring 106 will sufficiently expand to keep the transfer bar 54 in contact with the pin 60.

Movement of the rolling beam 44 is affected by turning the hand crank 108 secured to a shaft 110 extending across the base member 12. A worm 112 secured intermediate the ends of the shaft 110 engages a worm wheel 114 secured to a second shaft 116 extending transversely across the base member 12. A pinion gear 118 secured to the transverse shaft 116 engages a rack 120 formed on the underside of the rolling beam 44 and exposed through an opening 122 formed in the base member. The pitch of the rack 120 is a function of the diameter of the base cylinder 34 thereby making it possible to graduate a dial 124 secured to the end of the transverse shaft 116 and disposed on the side face of the base member 12 in the degrees of roll of the base cylinder.

In operation the rolling beam 44 is moved along the guide member 36 with which it is in rolling contact by the rack 120 and pinion 118. The base cylinder 34 being in non-slip frictional engagement with the rolling beam 44 is rotated about its axis by movement of the beam and thereby causes rotational movement of the gear 32. Movement of the rolling beam 44 is imputed to the transfer bar 54 by the pin 60 engaging one end of the bar. The movement of the transfer bar 54 is panographically transferred as shown on Figure 7 to the slide block 66 through the pin 76 of the extended arm 74 engaging the other end of the transfer bar 54. Whether or not the movement imputed to the slide block 66 is proportionately greater or less than that of the rolling beam 44 is dependent upon whether the pin 76 of the extended arm 74 of the slide block is a greater or lesser distance from the pivotal point of the transfer bar 54 as compared with the location of the pin 60 of the rolling beam with respect thereto. This ratio is varied by changing the gauge blocks 72 and thereby changing the position of the pin 76 with respect to the pivot point of the transfer bar 54. The ratio of the diameter of the base cylinder 34 to the diameter of the base circle of the gear, from which the involute curvature of the gear teeth is derived, is the same as the ratio of the distance between the pin 60 and the shaft 58 about which the transfer bar 54 is pivoted to the distance between the pin 76 and the transfer bar shaft 58. The gauge blocks 72 are adapted to vary the transverse position of the slide block carrier 62 with respect to the rolling beam 44 to position the pin 76 of the extended arm 74 of the slide block 66 within a plane parallel to the rolling beam 44 and tangential to the base circle of the gear 32.

Referring for a moment to the general definition of an involute curve as that curve which is generated by the end of a string unwound from a given circle it is clear that if a cylinder 34 is revolved about its own axis, and being in frictional engagement with a rolling beam 44 is adapted to longitudinally move such beam, that the relative movement between the initial points of contact on such cylinder and rolling beam will be the same as the relative movement between such points in evolving an involute curve. If the longitudinal movement of the rolling beam 44 is then transferred to a slide block 66 for corresponding longitudinal movement of the slide block in the proportionate relation of the diameter of the base cylinder 34 to the base circle of a gear 32 to be tested, which gear is revolved about its own axis at the same rate as the base cylinder, then the relative movement of the slide block 66 as compared to the base circle of the gear 32 will similarly be that which would evolve an involute curve with respect to the base circle of the gear.

Inasmuch as the gear 32 already has teeth of involute curvature formed thereon the pointer 82 will follow the machined involute curvature of such tooth as the slide block 66 is longitudinally moved by the transfer bar 54 and the gear 32 revolves about its own axis. As long as the machined face of the gear tooth is a true involute curve the reactor arm 86 of the feeler gauge 80 will remain motionless. However, upon the detection by the pointer 82 of a variance the reactor arm moves against the plunger 92 of the tolerance gauge 90 and the gauge will show the extent of variation between the machined surface and a true involute curve.

I claim:

An involute curve checking device including a base member having an arcuate surfaced member mounted thereon for rotation, a straight edged member disposed on one side of said arcuate surfaced member and frictionally and tangentially engaged therewith, a slide block member disposed on the other side of said arcuate surfaced member in adjustable parallel spaced relation to said straight edged member, a transfer bar pivotally mounted on said base member between said straight edged and slide block members and having the ends thereof engaged with said spaced members, said arcuate surfaced member being adapted to receive a gear toothed member axially thereof and for rotation therewith, said slide block member including gauge means having an adjustable pointer disposed for light engagement with a tooth of said gear member, the rotational and pivotal axes of said arcuate surfaced member and said transfer bar and the points of engagement of said transfer bar with said slide block and said pointer with said gear member being in planes parallel to said straight edged and slide block members, a second arcuate surfaced member mounted on said base member in spaced relation to said first mentioned arcuate surfaced member and having an axis of rotation on a line intersecting the axis of rotation of said first mentioned arcuate member and parallel to said straight edged member, said second arcuate surfaced member having a radius of curvature the same as said first mentioned arcuate member and being frictionally and tangentially engaged by said straight edged member, said transfer bar being secured to said second arcuate surfaced member for pivotal movement therewith, the points of engagement of said transfer bar with said spaced members being aligned through the pivotal center of said transfer bar, and means imputing rectilinear movement of said straight edged member and relative involute movement therethrough to said gear member and pointer.

References Cited in the file of this patent

UNITED STATES PATENTS

| | | |
|---|---|---|
| 1,564,589 | Laessker | Dec. 8, 1925 |
| 2,013,365 | Snarry | Sept. 3, 1935 |
| 2,673,401 | Bradner | Mar. 30, 1954 |